United States Patent [19]

Kelso et al.

[11] 4,439,593

[45] Mar. 27, 1984

[54] POLYURETHANE COMPOSITIONS WITH IMPROVED STORAGE STABILITY

[75] Inventors: Robert G. Kelso, Wexford; Meena S. Ahuja, Pittsburgh, both of Pa.; Peter D. Schmitt, Glen Dale, W. Va.

[73] Assignee: Mobay Chemical Corporation, Pittsburgh, Pa.

[21] Appl. No.: 498,225

[22] Filed: May 26, 1983

[51] Int. Cl.³ .................. C08G 18/80; C08G 18/32; C08G 18/42
[52] U.S. Cl. ........................ 528/45; 528/49; 528/53; 528/54; 528/57
[58] Field of Search .................... 528/45, 49

[56] References Cited

U.S. PATENT DOCUMENTS

| | | | |
|---|---|---|---|
| 2,801,990 | 8/1957 | Seeger et al. | 260/75 |
| 2,877,193 | 3/1959 | Roussel | 260/18 |
| 3,428,611 | 2/1969 | Brotherton et al. | 260/75 |
| 3,621,000 | 11/1971 | Schmelzer et al. | 260/77.5 |
| 3,681,288 | 8/1972 | Bonin et al. | 260/77.5 |
| 3,779,794 | 12/1973 | De Santis | 117/72 |
| 4,007,215 | 2/1977 | Hartmann et al. | 260/468 |
| 4,071,505 | 1/1978 | Meckel et al. | 260/77.5 |
| 4,087,392 | 5/1978 | Hartmann et al. | 260/24 |
| 4,100,144 | 7/1978 | Duenwald et al. | 260/860 |
| 4,101,530 | 7/1978 | Burkhardt et al. | 528/45 |
| 4,132,843 | 1/1979 | Dalibor | 528/45 |
| 4,163,094 | 7/1979 | Turpin | 528/45 |
| 4,235,766 | 11/1980 | Kaliper | 260/33.4 |
| 4,280,944 | 7/1981 | Saito et al. | 260/29.2 |
| 4,332,965 | 6/1982 | Dalibor | 560/169 |
| 4,409,340 | 10/1983 | Stolzenbach et al. | 521/159 |

FOREIGN PATENT DOCUMENTS

| | | |
|---|---|---|
| 2623081 | 11/1977 | Fed. Rep. of Germany . |
| 2639491 | 2/1978 | Fed. Rep. of Germany . |
| 1442024 | 7/1976 | United Kingdom . |
| 1523103 | 8/1978 | United Kingdom . |

*Primary Examiner*—H. S. Cockeram
*Attorney, Agent, or Firm*—Gene Harsh; Joseph C. Gil; Thomas W. Rey

[57] ABSTRACT

The present invention is directed to a process for improving the storage stability of a composition containing (a) a blocked polyisocyanate component prepared by blocking the isocyanate groups of an organic polyisocyanate with a blocking agent comprising a di-$C_1$-$C_{12}$-alkyl and/or -alkoxyalkyl malonate and (b) a component comprising a compound containing at least two isocyanate-reactive hydrogens, which comprises incorporating a stabilizing amount of a compound having monofunctional reactivity towards isocyanates into the composition by adding said compound to component (a), component (b) or to the mixture of components (a) and (b).

The present invention is also directed to the storage stable composition produced in accordance with the above process.

21 Claims, No Drawings

POLYURETHANE COMPOSITIONS WITH IMPROVED STORAGE STABILITY

BACKGROUND OF THE INVENTION

1. Field of the Invention

The present invention is directed to increasing the storage stability of compositions containing blocked polyisocyanates and a compound having isocyanate-reactive hydrogens by adding a stabilizing amount of a compound having monofunctional reactivity toward isocyanates.

2. Description of the Prior Art

Coating compositions based on a blocked polyisocyanate component and a component containing isocyanate-reactive hydrogens are known. The purpose of the blocking agent is to prevent the polyisocyanate from reacting with the isocyanate-reactive component at ambient temperature conditions and thus allows the two components to be mixed and stored prior to their actual use. When the composition is baked at an elevated temperature, the blocking agent is released and the reaction of the two components commences. When using common blocking agents such as ε-caprolactam, unblocking temperatures in excess of 170° C. are needed to provide acceptable rates of unblocking.

The high temperatures needed for unblocking are detrimental for two reasons. First, the high temperatures can cause yellowing of the reacted polyurethane compositions. Second, the energy requirements are much higher when compared to competitive systems based on aminoplast resins and polyhydroxyl compounds which can be baked at temperatures of about 125° C. using acid catalysis. Since the unblocking temperatures of the conventional polyisocyanate-based systems are much higher, the manufacturing facilities designed for the competitive aminoplast systems cannot accommodate the conventional blocked polyisocyanate systems. Accordingly, even though the compositions based on blocked polyisocyanates and compounds containing isocyanate-reactive hydrogens yield products with a combination of superior hardness and elasticity when compared to the competitive systems, the need exists for a polyisocyanate-based system which is stable under ambient conditions and wherein the blocked polyisocyanate component may be reacted at lower temperatures within an acceptable period of time.

While it is known from U.S. Pat. Nos. 2,801,990; 3,779,794; 4,007,215; 4,087,392; 4,101,530; 4,132,843 and 4,332,965; British Pat. Nos. 1,442,024 and 1,523,103; German Offenlegungsschrift 2,623,081 and German Auslegeschrift 2,639,491 that polyisocyanates blocked with C-H acidic compounds such as malonic acid esters and acetoacetic acid esters can be reacted at lower temperatures, it has been found that when combined with suitable co-reactants, these systems do not remain stable. When these systems are stored, the viscosity gradually increases until the systems gel. The higher the storage temperature, the faster gelation occurs.

Accordingly, it is an object of the present invention to provide compositions based on a blocked polyisocyanate component and a component containing isocyanate-reactive hydrogens which possess improved storage stability. It is an additional object to provide compositions wherein the polyisocyanate can be reacted at lower temperatures than conventional blocked polyisocyanates. It is a further object to provide compositions which can be cured to produce polyurethanes possessing properties which are superior to the competitive, low temperature systems.

These and other objects may be achieved by proceeding in accordance with the present invention as described below.

SUMMARY OF THE INVENTION

The present invention is directed to a process for improving the storage stability of a composition containing (a) a blocked polyisocyanate component prepared by blocking the isocyanate groups of an organic polyisocyanate with a blocking agent comprising a di-$C_1$–$C_{12}$-alkyl and/or -alkoxyalkyl malonate and (b) a component comprising a compound containing at least two isocyanate-reactive hydrogens, which comprises incorporating a stabilizing amount of a compound having monofunctional reactivity towards isocyanates into the composition by adding said compound to component (a), component (b) or to the mixture of components (a) and (b).

The present invention is also directed to the storage stable composition produced in accordance with the above process.

DETAILED DESCRIPTION OF THE INVENTION

The blocked polyisocyanates used in the compositions of the present invention preferably contain an average of about 2–6, preferably about 2–4, blocked isocyanate groups per molecule and may be prepared from virtually any organic polyisocyanate, preferably from polyisocyanates containing 2–4 isocyanate groups. Preferred are polyisocyanates having aromatically-, aliphatically- or cycloaliphatically-bound isocyanate groups, or mixtures thereof.

The polyisocyanates used for preparing the blocked polyisocyanates may be monomeric in nature or adducts prepared from organic diisocyanates and containing biuret, allophanate, urea, urethane or carbodiimide groups or isocyanurate rings. Suitable polyisocyanates which may be used as such or as intermediates for preparing polyisocyanate adducts include ethylene diisocyanate, 1,4-tetramethylene diisocyanate, 1,6-hexamethylene diisocyanate, 2,4,4-trimethyl-1,6-hexamethylene diisocyanate, 1,12-dodecane diisocyanate, cyclobutane-1,3-diisocyanate, cyclohexane-1,3- and 1,4-diisocyanate and mixtures of these isomers, 1-isocyanato-2-isocyanatomethyl cyclopentane, 1-isocyanato-3,3,5-trimethyl-5-isocyanatomethyl cyclohexane, 2,4- and 2,6-hexahydro tolylene diisocyanate and mixtures of these isomers, 2,4'- and/or 4,4'-dicyclohexyl methane diisocyanate, 1,3- and 1,4-phenylene diisocyanate, 2,4-and 2,6-tolylene diisocyanate and mixtures of these isomers, diphenyl methane-2,4'- and/or -4,4'-diisocyanate, naphthalene-1,5-diisocyanato, triphenyl methane-4,4',4'''-triisocyanate, polyphenyl polymethylene polyisocyanates of the type obtained by condensing aniline with formaldehyde followed by phosgenation, and mixtures of the above-mentioned polyisocyanates.

Polyisocyanate adducts containing biuret groups may be prepared from the previously mentioned diisocyanates according to the processes disclosed in U.S. Pat. Nos. 3,124,605; 3,358,010; 3,644,490; 3,862,973; 3,903,126; 3,903,127; 4,051,165; 4,147,714 or 4,220,749 by using coreactants such as water, tertiary alcohols, primary and secondary monoamines, and primary and- /or secondary diamines. The preferred diisocyanate to be used in these processes is 1,6-diisocyanatohexane.

Polyisocyanate adducts containing allophanate groups may be prepared by reacting the previously mentioned diisocyanates according to the processes disclosed in U.S. Pat. Nos. 3,769,318 and 4,160,080, British Pat. No. 994,890 and German Offenlegungsschrift No. 2,040,645.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992; 4,288,586; and 4,324,879; German Auslegeschrift No. 1,150,080; German Offenlegungsschrift No. 2,325,826; and British Pat. No. 1,465,812. The preferred diisocyanates to be used are 2,4-diisocyanatotoluene, 2,6-diisocyanatotoluene, mixtures of these isomers, 1,6-diisocyanatohexane, isophorone diisocyanate and mixtures of the latter two diisocyanates.

Polyisocyanate adducts containing urea and/or urethane groups and based on the reaction product of the previously mentioned diisocyanates and compounds containing 2 or more isocyanate-reactive hydrogens may be prepared according to the process disclosed in U.S. Pat. No. 3,183,112. In preparing polyisocyanate adducts the average isocyanate functionality is determined from the functionality of the compounds containing isocyanate-reactive hydrogens. For example, theoretically when an excess of a diisocyanate is reacted with a diol, a polyisocyanate with a functionality of approximately 2 will be produced, while a triol coreactant will result in a polyisocyanate functionality of at least 3. By using mixtures of compounds containing isocyanate-reactive hydrogens, various functionalities can be obtained. Suitable compounds containing 2 or more isocyanate-reactive hydrogens are those with molecular weights of up to 400 as set forth hereinafter, while the preferred diisocyanates are 2,4-diisocyanatotoluene, 2,6-diisocyanatotoluene, mixtures of these isomers, 1,6-diisocyanatohexane and isophorone diisocyanate.

Prior to their use in the compositions of the present invention, the polyisocyanates are blocked with C-H acidic compounds such as a di-$C_1$-$C_{12}$-alkyl and/or -alkoxyalkyl, preferably a $C_1$-$C_4$-dialkyl malonate. The most preferred blocking agent is diethyl malonate. Preferably, these blocking agents are used as the sole blocking component for reaction with the polyisocyanates. However, it is possible to use up to about 20 mole %, preferably up to about 10 mole %, of other known blocking agents, e.g. secondary or tertiary alcohols such as isopropanol or t-butanol; oximes such as formaldoxime, acetaldoxime, butanone oxime, cyclohexanone oxime, acetophenone oxime, benzophenone oxime or diethyl glyoxime; lactams such as $\epsilon$-caprolactam or $\delta$-valerolactam; phenols such as phenol or cresol; N-alkyl amides such as N-methyl acetamide; imides such as phthalimide; imidazole; or alkali metal bisulfites. While polyisocyanates blocked with these other known blocking agents will react normally with the isocyanate-reactive component of the subject invention when using sufficiently elevated temperatures, they will not react significantly at the preferred low temperature baking conditions of the present invention and, accordingly, should only be used in the amounts specified when operating in this manner. To compensate for the low reactivity of these blocked polyisocyanates, the amount of the isocyanate-reactive component may be correspondingly reduced. The unreacted blocked polyisocyanates will remain in the cured coating and provide a softening effect.

It is also possible to replace up to about 60 mole %, preferably up to about 50 mole %, of the malonate-based blocking agents with acetoacetic acid $C_1$-$C_{12}$-, preferably $C_1$-$C_4$-alkyl or -alkoxyalkyl esters such as ethylacetoacetate or ethoxyethylacetoacetate. It has been found that when acetoacetic acid esters are exclusively used as the blocking agent, the reactivity of blocked polyisocyanate towards the isocyanate-reactive component is reduced in the presence of the monofunctional stabilizer resulting in coatings which are tacky and incompletely cured. However, when equimolar mixtures of the dialkyl malonate and acetoacetic acid esters are used as the blocking agent, fully cured films are obtained from the stabilized compositions of the present invention.

The reaction between the polyisocyanates and the blocking agent is generally conducted at above about 50° C., preferably from about 60° to 100° C., optionally in the presence of a basic catalyst such as diazabicyclooctane, triethyl amine, alkali metal alcoholates such as sodium methoxide or alkali metal phenolates such as sodium phenolate.

The component to be used in combination with the blocked polyisocyanates is selected from the known compounds containing isocyanate-reactive groups, preferably hydroxyl groups, which are at least difunctional in the sense of the isocyanate-addition reaction.

These compounds generally have an average functionality of about 2 to 8, preferably about 2 to 4. The amounts of the blocked polyisocyanate component and the component containing at least 2 isocyanate-reactive hydrogens are chosen so that for every isocyanate-reactive group the composition contains from about 0.8 to 1.6 and preferably from about 0.9 to 1.1 isocyanate groups blocked by C-H acidic compounds. It is possible during the actual production of the compositions according to the present invention to use the lacquer solvents which are in any case required for their subsequent use.

The compounds containing at least two isocyanate-reactive hydrogen atoms present in the binders according to the present invention generally have a molecular weight of from 400 to about 10,000, preferably from 400 to about 8,000. However, it is also possible to use low molecular weight compounds having molecular weights below 400. The only requirement is that the compounds used should not be volatile under the stoving conditions used to cure the compositions.

Preferred compounds containing isocyanate-reactive hydrogen atoms are the known polyester polyols, polyether polyols, polyhydroxy polyacrylates and polycarbonates containing hydroxyl groups. In addition to these preferred polyhydroxyl compounds it is also possible in accordance with the present invention to use polyhydroxy polyacetals, polyhydroxy polyester amides, polythioethers containing terminal hydroxyl groups or sulphydryl groups or at least difunctional compounds containing amino groups, thiol groups or carboxyl groups. Mixtures of the compounds containing isocyanate-reactive hydrogen atoms may also be used.

High molecular weight polyester polyols which are suitable include, e.g. reaction products of polyhydric, preferably dihydric alcohols to which trihydric alcohols may be added and polybasic, preferably dibasic carboxylic acids. Instead of free polycarboxylic acids, the corresponding polycarboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid, adipic acid, suberic acid; azelaic acid; sebacic acid, phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid; which may be mixed with monomeric fatty acids; dimethyl terephthalate and bisglycolterephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl-1,3-propanediol; glycerol; trimethylolpropane; hexanetriol-(1,2,6); butanetriol-(1,2,4); trimethylolethane; triethylene glycol; tetraethylene glycol; polyethylene glycol; dipropylene glycol; polypropylene glycol; dibutylene glycol and polybutylene glycol. The polyesters may also contain a proportion of carboxyl end groups. Polyesters of lactones, e.g. ε-caprolactone, or hydroxycarboxylic acids, e.g. ω-hydroxycaproic acid, may also be used.

The higher molecular weight polyethers which are preferably used according to the invention are obtained in known manner by reaction of the starting compounds which contain reactive hydrogen atoms with alkylene oxides such as ethylene oxide; propylene oxide; butylene oxide; styrene oxide; tetrahydrofuran or epichlorohydrin or with any mixtures of these alkylene oxides.

Suitable starting compounds containing reactive hydrogen atoms include, e.g. water; methanol; ethanol; ethylene glycol; propylene glycol-(1,2) or -(1,3); butylene glycol-(1,4) or -(1,3); hexanediol-(1,6); octanediol-(1,8); neopentyl glycol; 1,4-bishydroxymethylcyclohexane; 2-methyl-1,3-propanediol; glycerol; trimethylolpropane; hexanetriol-(1,2,6); butanetriol-(1,2,4); trimethylolethane; pentaerythritol; mannitol; sorbitol; methyl glycoside; sucrose; phenol; isononylphenol; resorcinol; hydroquinone; 1,2,2- or 1,1,3-tris-(hydroxyphenyl)-ethane; ammonia; methylamine; ethylene diamine; tetra- or hexamethylene diamine; diethylenetriamine; ethanolamine; diethanolamine; triethanolamine; aniline; phenylenediamine; 2,4- and 2,6-diaminotoluene and polyphenylpolymethylene polyamines of the kind obtained by aniline-formaldehyde condensation optionally containing alkyl substituents such as bis-(4-amino-3-methyl-phenyl)-methane. Resinous materials such as phenol and resol resins may also be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Pat. No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from glycols such as diethylene glycol; triethylene glycol; 4,4'-dioxethoxy-diphenyldimethylene; hexanediol and formaldehyde. Polyacetals suitable for the purpose of the invention may also be prepared by the polymerization of cyclic acetals.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with diarylcarbonates, e.g. diphenylcarbonate, or phosgene.

Suitable polyhydroxy polyester amides and polyamides are, for example, the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate, and 2-isocyanatoethyl methacrylate.

The preferred high molecular weight polyol components are the polyester, polyacrylate, polycarbonate and polyether polyols or mixtures thereof.

The compositions may also contain a low molecular weight isocyanate-reactive component having an average molecular weight of up to about 400. The low molecular weight isocyanate-reactive component may contain a single compound or a mixture of compounds, but should have an average functionality of about 2 to 8, preferably from about 2 to 6 and most preferably from about 2 to 4, and may also contain ether, thioether, ester, urethane and/or urea bonds.

Examples of low molecular weight compounds include the polyamines and diols or triols used as chain lengthening agents or cross-linking agents in polyurethane chemistry such as those listed as suitable for preparing the polyester and polyether polyols. Suitable diols and triols include propylene glycol-(1,2) and -(1,3), butylene glycol-(1,4) and -(1,3); hexanediol-(1,6); octane diol-(1,8); neopentyl glycol, cyclohexane dimethanol (1,4-bis-hydroxymethylcyclohexane); 2-methyl-1,3-propanediol; glycerol; trimethylolpropane; hexane triol-(1,2,6); butanetriol-(1,2,4) or trimethylolethane, and also glycols such as ethylene glycol, diethyleneglycol, triethylene glycol, tetraethylene glycol and polyethylene glycols having a molecular weight of up to 400. In addition compounds such as dipropylene glycol, polypropylene glycols having a molecular weight of up to 400, dibutylene glycol, polybutylene glycols having a molecular weight of up to 400, thiodiglycol and castor oil may also be used according to the invention.

Suitable polyamines are essentially hydrocarbon polyamines which have isocyanate-reactive hydrogens according to the Zerewitinoff test, e.g., primary or secondary amine groups. The polyamines are generally aromatic, aliphatic or alicyclic amines containing between about 1 to 30 carbon atoms, preferably about 2 to 15 carbon atoms, and most preferably about 2 to 10 carbon atoms. Examples of suitable polyamines include diaminoethane, 1,6-diaminohexane, piperazine, 2,5-dimethylpiperazine, 1-amino-3-aminomethyl-3,5,5-trimethylcyclohexane, bis-(4-aminocyclohexyl)-methane, bis-(4-amino-3-methyl-cyclohexyl)-methane, 1,4-diaminocyclohexane, 1,2-propylenediamine, hydrazine, amino acid hydrazides, hydrazides of semicarbazidocarboxylic acids, bis-hydrazides, bis-semicarbazides, diethylene triamine, triethylene tetramine, tetraethylene pentamine, pentaethylene hexamine, N,N,N-tris-(2-aminoethyl)amine, N-(2-piperazinoethyl)ethylene diamine, N,N'-bis-(2-aminoethyl)piperazine, N,N,N'-tris-(2-aminoethyl)-ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine and 2,4-bis-(4'-aminobenzyl)-aniline.

Also suitable are ester diols of the general formulae

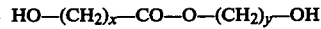

and

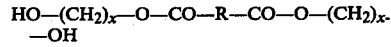

in which
R represents an alkylene or arylene group having from 1 to 10, preferably 2 to 6 carbon atoms,
x=2 to 6 and
y=3 to 5,
e.g. δ-hydroxybutyl-ε-hydroxycaproic acid ester; ω-hydroxyhexyl-δ-hydroxybutyric acid ester; adipic acid-bis-(β-hydroxyethyl)-ester and terephthalic acid-bis-(β-hydroxyethyl)-ester; as well as diol urethanes of the general formula

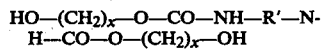

in which
R' represents an alkylene, cycloalkylene or arylene group having from 2 to 15, preferably from 2 to 9 carbons and
x represents an integer of from 2 to 6,
e.g. 4,4'-dicyclohexyl-methane-bis-(β-hydroxyethylurethane) or 4,4'-dicyclohexyl-methane-bis-(β-hydroxybutylurethane).

Also suitable are diol ureas of the general formula

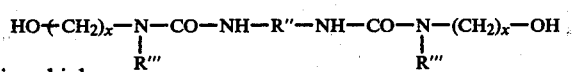

in which
R" represents an alkylene, cycloalkylene or arylene group having from 2 to 15, preferably from 2 to 9 carbons and
R''' represents hydrogen or a methyl group and
x=2 or 3, e.g. 4,4'-dicyclohexyl-methane-bis-(β-hydroxyethylurea).

Also suitable as low molecular weight isocyanate-reactive components are the amino alcohols, especially those defined according to the following formula,

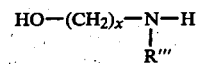

wherein
R''' represents hydrogen or a methyl group, and
x=2 or 3.

In addition to using the previously described polyisocyanates for preparing the blocked polyisocyanate component of the subject application, it is also possible to prepare the blocked polyisocyanate component from isocyanate-terminated prepolymers. These prepolymers are formed by reacting an excess of the previously described polyisocyanates with the previously described high molecular weight isocyanate-reactive compounds, and optionally the low molecular weight isocyanate-reactive compounds. Prepolymers prepared exclusively from polyisocyanates and low molecular weight isocyanate-reactive compounds are referred to as polyisocyanate adducts containing urea and/or urethane groups and have previously been discussed. A sufficient excess of the polyisocyanate should be used to ensure that the prepolymers are terminated with isocyanate groups.

It should also be ensured that the isocyanate-terminated prepolymers remain soluble in the commonly used polyurethane solvents and do not gel. Gelation may result when sufficiently cross-linked, isocyanate-terminated prepolymers are prepared from polyisocyanates or isocyanate-reactive compounds containing more than two reactive groups. Minimal amounts of cross-linking do not lead to gelation; however, once a sufficient cross-linked density is achieved, gelation occurs. The critical cross-link density, commonly referred to as the gel point, may be calculated by known methods or readily determined by simply reacting the desired components and observing whether gel particles form. In order to avoid gelation, it is preferred to prepare the isocyanate-terminated prepolymers from the polyisocyanate described as suitable for use in preparing the polyisocyanate adducts rather than using the polyisocyanate adducts themselves. It is additionally preferred to prepare the isocyanate-terminated prepolymers from high molecular weight isocyanate-reactive compounds which do not contain excessive amounts of branching in order to further reduce the possibility that gelation will occur. Finally, it is preferred to prepare the isocyanate-terminated prepolymers by adding the isocyanate-reactive compound to the polyisocyanate since this helps to maintain an excess of isocyanate throughout the formation of the prepolymer.

Following the formation of the isocyanate-terminated prepolymers, the prepolymers are blocked with the C-H acidic compounds in the previously described manner. The blocked isocyanate-terminated prepolymers are then mixed with the high and/or low molecular weight, isocyanate-reactive compounds utilizing the ratio of blocked isocyanate groups to isocyanate-reactive groups previously set forth herein.

In addition to using the previously described high and/or low molecular weight isocyanate-reactive compounds in formulating the compositions of the subject invention, it is also possible to use OH-terminated prepolymers as a portion or all of this component. The OH-terminated prepolymers are prepared by reacting an excess of the isocyanate-reactive component with a polyisocyanate. The same concerns previously set forth for avoiding gelation in the formation of the isocyanate-terminated prepolymers should also be followed in preparing the OH-terminated prepolymers. In addition, when preparing the OH-terminated prepolymers, the polyisocyanate should be added to the isocyanate-reactive compound in order to maintain an excess of the isocyanate-reactive compound throughout the formation of the OH-terminated prepolymer.

It is also possible to satisfy the requirements of components (a) and (b) by providing compounds containing one blocked isocyanate group and one isocyanate-reactive group. For example, instead of forming a composition from a diisocyanate containing two blocked isocyanate groups and an equivalent amount of a compound containing two isocyanate-reactive groups, the same components can be used to prepare a compound containing one blocked isocyanate group and one isocyanate-reactive group as follows. One of the isocyanate groups of a diisocyanate is blocked to form a compound containing one blocked isocyanate group and one free isocyanate group. This compound is then reacted with an equivalent amount (equivalent ratio of free isocyanate groups to isocyanate-reactive groups equals 1:2, equivalent ratio of blocked plus free isocyanate groups to isocyanate-reactive groups equals 1:1) to form the compound containing one blocked isocyanate group and one isocyanate-reactive group. Other examples of compounds of this type which satisfy the requirements of both components (a) and (b) would be readily apparent to those of skill in the art.

Once the polyisocyanate component and the isocyanate-reactive component have been selected, the storage stability of compositions containing a blocked polyisocyanate component and an isocyanate-reactive component may be improved by incorporating a stabilizing amount of a compound having monofunctional reactivity toward isocyanate groups. The stabilizer may be added to the composition or to the individual components prior to their being mixed to form the compositions. The stabilizing compounds include primary, secondary or tertiary monoalcohols and primary or secondary monoamines having molecular weights of up to about 400. Suitable monofunctional compounds include methanol, ethanol, propanol, isopropanol, 1-butanol, 2-butanol, t-butanol, methyl amine, ethyl amine, propyl amine, 2-aminopropane, butyl amine, 2-aminobutane, t-butylamine, ethylene glycol monoethyl ether, ethylene glycol monomethyl ether, ethylene glycol monobutyl ether, diethylene glycol monomethyl ether, diethylene glycol monoethyl ether, diethylene glycol monobutyl ether and propylene glycol monomethyl ether. Additional examples of suitable monofunctional alcohols are contained in U.S. Pat. No. 4,355,138, herein incorporated by reference.

The preferred stabilizing compounds are the highly volatile, low molecular weight monoalcohols and monoamines, especially the monoalcohols, since at the baking temperatures necessary for curing the compositions, these monofunctional compounds are volatilized from the coating compositions and do not form a part of the cured coating to any substantial degree. However, when it is desired to retain the stabilizer in the cured coating, it is preferred to use monoalcohols having a vaporization point higher than the baking temperature. The retained stabilizers have a softening effect on the cured coating. The stabilizers are added in amounts greater than 0.01%, preferably greater than about 0.5, and most preferably greater than about 1% by weight based on the solids content of the coating composition.

The upper limit of the stabilizers is generally 20%, preferably 10%, and most preferably 5% based on the solids content of the coating composition. Even though amounts greater than about 20% by weight do not normally further improve the stability, amounts greater than 20% may be used when it is desired to also use monoalcohols as solvents for the compositions of the present invention.

As mentioned above, a solvent or solvent mixture is preferably used during production of the compositions when mixing the polyisocyanate component with the components containing isocyanate-reactive groups. This solvent or solvent mixture preferably remains in the composition until it is used. However, it is of course also possible to use a solvent simply to promote thorough mixing of the components and subsequently to distill off this solvent (in vacuo) leaving a ready-to-use mixture in solvent-free form which may be redissolved in solvents at any later stage.

Suitable solvents include the known polyurethane solvents, for example, toluene, xylene, butyl acetate, ethylacetate, ethylene glycol monoethyl ether acetate (EGA), ethylene glycol monomethyl ether acetate, ethylene glycol monobutyl ether acetate, diethylene glycol monoethyl ether acetate, diethylene glycol monomethyl ether acetate, diethylene glycol monobutyl ether acetate, propylene glycol monomethyl ether acetate, methyl ethyl ketone or methyl isobutyl ketone, hydrocarbon solvents such as hexane and heptane, aromatic solvents and also mixtures of the above solvents.

In the compositions prepared according to the present invention, the solvents are generally present in such quantities that the content of nonvolatile binder constituents is no less than about 20%, preferably from about 30 to 80% by weight.

Additives, such as catalysts, pigments, dyes and levelling aids, may be added as required to the compositions of the present invention.

The compositions produced according to the present invention may be stored as such for prolonged periods at room temperature without gel formation or any other undesirable changes occurring. They may be diluted as required to a suitable concentration and applied by the conventional methods, for example spraying or spread coating, and heated, generally to temperatures in excess of about 100° C., preferably from about 100° to 150° C., more preferably from about 120° to 130° C., in order to cure the coating.

The compositions may be used as coating agents for primer, intermediate or surface coatings for a variety of different substrates. The resulting coatings possess excellent adhesion to substrates, are uniform and exhibit excellent mechanical and chemical properties and water and solvent resistance, especially hardness, impact resistance and elasticity.

The invention is further illustrated, but is not intended to be limited by the following examples in which all parts and percentages are by weight unless otherwise specified.

EXAMPLES

The following components were used in the following examples as indicated.

Polyisocyanate Component I 2484 parts of polypropylene glycol (MW 4000) were added to and reacted with 1000 parts of a 70/30 mixture of 4,4'- and 2,4'-diphenylmethane diisocyanate at a temperature of 60°–70° C. until an NCO content of 7.8% was obtained.

2000 parts of this isocyanate-terminated prepolymer were mixed with 715.4 parts of diethyl malonate and 20 parts of a 25% solution of sodium methoxide in methanol and heated to 60°–70° C. for several hours. During the reaction 1430 parts of ethylene glycol monoethyl ether acetate were added and the temperature of 60°–70° C. was maintained until the NCO content was essentially zero.

Polyisocyanate Component II

The theoretical reaction product of 3 moles of isophorone diisocyanate and 1 mole of trimethylolpropane was prepared by reacting an excess of the diisocyanate with the triol and removing the excess of diisocyanate by distillation. The polyisocyanate adduct was diluted with a mixture of equal parts of ethylene glycol monoethyl ether acetate and xylene and then blocked with diethyl malonate in a manner similar to Polyisocyanate Component I to produce a blocked adduct with a 75% solids content.

Polyisocyanate Component III

A polyisocyanate containing isocyanurate groups and prepared from 1,6-diisocyanatohexane was blocked with an equimolar mixture of diethyl malonate and ethylacetoacetate. The blocked polyisocyanate was present at a 75% solids concentration in a 1/1 mixture of ethylene glycol monoethyl ether acetate and xylene.

Isocyanate-Reactive Component I

A polyester polyol having an OH number of 145 and a functionality of 3.1 was prepared from 1,6-hexane diol and trimethylolpropane (weight ratio 3.5:1) and isophthalic acid, adipic acid and phthalic acid anhydride (weight ratio of 5.6:2:1).

Isocyanate-Reactive Component II

A polyester polyol having an OH number of 162 and a functionality of 2.8 was prepared from adipic acid, 1,3-butane diol and trimethylolpropane. 210 parts of the polyol were mixed with 10 parts of a grinding agent, 40 parts of $TiO_2$, 344 parts of filler, 10 parts of carbon black, 10 parts of a commercial thixotropic agent and 12 parts of a commercial levelling agent.

Isocyanate-Reactive Component III 206.6 parts of Isocyanate-Reactive Component I were mixed with 1.9 parts of a commercial levelling agent, 1.9 parts of a commercial oxidative stabilizer, 1.9 parts of a commercial UV stabilizer, 197.8 parts of $TiO_2$ and 73.9 parts of ethylene glycol monomethyl ether acetate.

EXAMPLE 1

300 g of Polyisocyanate Component I were mixed with 105.6 g of Isocyanate-Reactive Component I and the mixture was stored at 25° C. The viscosity of this mixture was determined periodically and the results are reported in Table I.

EXAMPLE 2

300 g of Polyisocyanate Component I were mixed with 105.6 g of Isocyanate-Reactive Component I and 1.6 g methanol and the mixture was stored at 25° C. The viscosity of this mixture was determined periodically and the results are reported in Table I.

TABLE I

|  | Viscosity (at 25° C.) | |
|---|---|---|
|  | Example 1 | Example 2 |
| Initial | 500 | 460 |
| 1 Week | 3,300 | 1,700 |
| 7 Weeks | 10,000 | 5,400 |
| 28 weeks | gel | 18,700 |

EXAMPLE 3

150 g of Polyisocyanate Component I were mixed with 52.8 g of Isocyanate-Reactive Component I, and then the stabilizers set forth in Table II were added to the mixture. The mixtures were stored at 50° C. and the viscosity at 25° C. was determined at 24 hour intervals. The viscosities are also reported in Table II.

TABLE II

| Stabilizer | Amount Added (g) | Wt. % of Total Mixture | Viscosity at 25° C. (cps) after 50° C. storage | | | | |
|---|---|---|---|---|---|---|---|
|  |  |  | Initial | 1 day | 2 days | 3 days | 4 days |
| None | 0 | 0 | 840 | 5,200 | 46,000 | gel |  |
| Methanol | 0.02 | 0.01 | 840 | 4,700 | 15,800 | 48,800 | 200,000 |
| Methanol | 0.04 | 0.02 | 800 | 4,650 | 16,400 | 50,000 | 200,000 |
| Methanol | 0.08 | 0.04 | 800 | 4,700 | 15,600 | 43,200 | 200,000 |
| Methanol | 0.22 | 0.1 | 740 | 4,800 | 17,000 | 55,200 | 200,000 |
| Methanol | 0.44 | 0.2 | 720 | 3,250 | 6,960 | 10,800 | 27,200 |
| Methanol | 0.88 | 0.4 | 700 | 2,400 | 3,840 | 5,800 | 7,500 |
| Methanol | 1.31 | 0.6 | 680 | 1,960 | 2,800 | 3,680 | 4,480 |
| Methanol | 2.12 | 1.0 | 640 | 1,480 | 1,920 | 2,160 | 2,400 |
| Methanol | 4.38 | 2.0 | 500 | 700 | 820 | 900 | 980 |
| Methanol | 6.6 | 3.0 | 460 | 540 | 600 | 640 | 720 |
| Methanol | 8.8 | 4.0 | 380 | 420 | 450 | 480 | 560 |
| Methanol | 12.9 | 6.0 | 280 | 300 | 320 | 330 | 360 |
| Methanol | 17.6 | 8.0 | 200 | 220 | 220 | 240 | 260 |
| Methanol | 22.5 | 10.0 | 220 | 200 | 200 | 200 | 210 |
| Methanol | 48.5 | 20.0 | 100 | 100 | 90 | 95 | 95 |
| t-butanol | 4.2 | 2.0 | 670 | 1,360 | 2,240 | 3,400 | 4,400 |
| Phenol | 4.2 | 2.0 | 580 | 1,320 | 2,560 | 4,000 | 5,280 |
| Benzyl alcohol | 4.2 | 2.0 | 740 | 1,400 | 2,400 | 3,720 |  |
| Diethylene glycol monoethyl ether | 18.4 | 8.0 | 320 | 860 | 1,160 | 1,400 | 1,700 |

(1)Stabilizer added to 142.7 g of Polyisocyanate Component I and 50.2 g of Isocyanate-Reactive Component I.

EXAMPLE 4

250 g of bis-(4-isocyanatophenyl)-methane were heated to about 60° C. followed by the dropwise addition of 2.1 g of sodium methoxide as a 25% solution in methanol and 320 g of diethyl malonate. The reaction mixture was maintained at about 60° C. until the NCO content was 2.35% whereupon 330 g of ethylene glycol monoethyl ether acetate and 747 g of Isocyanate-Reactive Component I were added. A temperature of 60° C. was maintained until no free isocyanate groups could be detected and then the mixture was allowed to cool at room temperature. The stabilizers set forth in Table III were added to 210 g samples of the mixture and the samples were stored at 25° C. for 10 days and then the storage temperature was increased to 60° C. The viscosities of the samples were determined periodically and the results are reported in Table III.

TABLE III

| Stabilizer | Amount Added (g) | Wt. % Based on Solids | Viscosity at 25° C. (cps) | | | | |
|---|---|---|---|---|---|---|---|
| | | | Initial | 3 days | 5 days | 12 days | 17 days |
| None | 0 | 0 | 4,200 | 39,250 | 66,400 | 95,000 | 114,000 |
| Methanol | 3.4 | 2.0 | 2,680 | 5,120 | 7,600 | 8,300 | 8,300 |
| Methanol | 8.4 | 5.0 | 1,480 | 1,800 | 2,200 | 2,300 | 2,400 |

EXAMPLE 5

14.1 g of diethylene glycol, 35.4 g of trimethylolpropane and 132.5 g of a polypropylene glycol (MW 1000) were mixed with 221.4 g of ethylene glycol monoethyl ether acetate and 147.6 g of xylene, charged to a reaction vessel and heated to 60° C. 196 g of a diisocyanate mixture of 80% 2,4- and 20% 2,6-diisocyanatotoluene were then added and the temperature was increased to 70°–80° C. for 2 hours. The temperature was then raised to 90°–100° C. until the isocyanate content was reduced to 5.22%. The mixture was cooled to 80° C. and 176.3 g of diethyl malonate were added. After the mixture had cooled to 70° C., 1.7 g of a 25% solution of sodium methoxide in methanol were added. The mixture was maintained at 60°–70° C. until the NCO content was essentially zero.

Two 25 g samples of the unstabilized mixture were then measured out. To the first sample was added 3.3 g of bis-(4-amino-3-methyl-cyclohexyl)-methane and 10 g of methylethylketone. To the second sample was added 3.3 g of bis-(4-amino-3-methyl-cyclohexyl)-methane and 10 g of isopropanol as a stabilizer. A third sample was prepared by mixing 12.9 g of the above unstabilized mixture with 0.8 g of bis-(4-amino-3-methyl-cyclohexyl)-methane, 1.1 g of diethyl amine as a stabilizer and 5.2 g methylethylketone.

After 16 days storage at room temperature, the first sample gelled; however, the second and the third samples remained liquid demonstrating the effect of the monofunctional stabilizers.

EXAMPLE 6

262.5 g of Polyisocyanate Component II were mixed with 12 g of a commercial defoaming agent and subsequently mixed with 636 g of Isocyanate-Reactive Component II, 120 g of diethylene glycol monobutyl ether and 40 g of isopropanol. The mixture was stored at 50° C. and the viscosity was measured periodically at 25° C. The results are reported in Table IV.

TABLE IV

| | Viscosity (Ford cup #4 in sec.) |
|---|---|
| Initial | 54 |
| 5 days | 56 |

TABLE IV-continued

| | Viscosity (Ford cup #4 in sec.) |
|---|---|
| 2 weeks | 45 |
| 3 weeks | 56 |
| 4 weeks | 60 |
| 8 weeks | 56 |

A steel panel was sprayed with the above coating composition and baked for 30 minutes at about 120° C. resulting in a cured, tack-free coating.

EXAMPLE 7

Sample I was prepared by first mixing 262.5 g of Polyisocyanate Component II with 12 g of a commercial defoaming agent and subsequently mixing in 636 g of Isocyanate-Reactive Component II, 120 g of ethylene glycol monoethyl ether and 40 g of isopropanol. Sample II was prepared identically to Sample I with the exception that 40 g of butanol was used in place of the 40 g of isopropanol. The samples were stored at 25° C. and the viscosity was measured periodically at 25° C. as set forth in Table V.

TABLE V

| | Viscosity (Ford cup #4 in sec) | |
|---|---|---|
| | Sample I | Sample II |
| Initial | 70 | 74 |
| 1 week | 66 | 70 |
| 3 weeks | 66 | 70 |
| 9 weeks | 71 | 76 |
| 13 weeks | 72 | 80 |
| 16 weeks | 72 | 80 |

EXAMPLE 8

A composition was prepared from 251.7 g of Polyisocyanate Component III, 484 g of Isocyanate-Reactive Component III and 257.40 g of a 1/1 mixture of ethylene glycol monoethyl ether and isopropanol. When the composition was coated onto a substrate and cured for 30 minutes at 110°–120° C., fully cured coatings resulted.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for improving the storage stability of a composition containing
  (a) a blocked polyisocyanate component prepared by blocking the isocyanate groups of an organic polyisocyanate with a blocking agent comprising a di-$C_1$—$C_{12}$—alkyl and/or —alkoxyalkyl malonate and
  (b) a component comprising a compound containing at least two isocyanate-reactive hydrogens, which comprises incorporating a stabilizing amount of a compound having monofunctional reactivity towards isocyanate groups into said composition by adding said compound to component (a), component (b) or to the mixture of components (a) or (b).

2. The process of claim 1 wherein said organic polyisocyanate of component (a) is a polyisocyanate adduct.

3. The process of claim 1 wherein said organic polyisocyanate of component (a) is an isocyanate-terminated prepolymer.

4. The process of claim 1 wherein said isocyanate-reactive hydrogens of component (b) are hydroxyl groups.

5. The process of claim 1 wherein said compound having monofunctional reactivity towards isocyanate groups is a monoalcohol and is present in an amount greater than about 0.5% by weight based on the weight of components (a) and (b).

6. The process of claim 1 wherein up to about 60 mole % of the di-$C_1$—$C_{12}$-alkyl and/or —alkoxyalkyl malonate blocking agent is replaced by an acetoacetic acid $C_1$—$C_{12}$—alkyl or —alkoxyalkyl ester.

7. The process of claim 1 wherein said blocking agent comprises diethyl malonate.

8. A composition with improved storage stability which comprises
   (a) a blocked polyisocyanate component prepared by blocking the isocyanate groups of an organic polyisocyanate with a blocking agent comprising a di-$C_1$—$C_{12}$—alkyl and/or —alkoxyalkyl malonate,
   (b) a component comprising a compound containing at least two isocyanate-reactive hydrogens and
   (c) a stabilizing amount of a compound having monofunctional reactivity towards isocyanate groups.

9. The composition of claim 8 wherein said organic polyisocyanate of component (a) is a polyisocyanate adduct.

10. The composition of claim 8 wherein said organic polyisocyanate of component (a) is an isocyanate-terminated prepolymer.

11. The composition of claim 8 wherein said isocyanate-reactive hydrogens of component (b) are hydroxyl groups.

12. The composition of claim 8 wherein said compound having monofunctional reactivity towards isocyanate groups is a monoalcohol and is present in an amount greater than about 0.5% by weight based on the weight of components (a) and (b).

13. The composition of claim 11 wherein said compound having monofunctional reactivity towards isocyanate groups is a monoalcohol and is present in an amount greater than about 0.5% by weight based on the weight of components (a) and (b).

14. The composition of claim 8 wherein up to about 60 mole % of the di-$C_1$—$C_{12}$—alkyl and/or —alkoxyalkyl malonate is replaced by an acetoacetic acid $C_1$—$C_{12}$—alkyl or —alkoxyalkyl ester.

15. The composition of claim 8 wherein said blocking agent comprises diethyl malonate.

16. A composition with improved storage stability which comprises
   (a) a blocked polyisocyanate component prepared by blocking the isocyanate groups of a polyisocyanate adduct with a blocking agent comprising diethyl malonate,
   (b) a component comprising a compound containing at least 2 hydroxyl groups and
   (c) a monoalcohol in an amount greater than about 0.5% by weight based on the weight of components (a) and (b).

17. The composition of claim 16 wherein said polyisocyanate adduct is prepared from 1,6-hexamethylene diisocyanate.

18. The composition of claim 16 wherein component (b) comprises a member selected from the group consisting of polyester polyols, polycarbonates containing hydroxyl groups and polyhydroxy polyacrylates.

19. The composition of claim 17 wherein component (b) comprises a member selected from the group consisting of polyester polyols, polycarbonates containing hydroxyl groups and polyhydroxy polyacrylates.

20. The composition of claim 16 wherein up to about 60 mole % of the diethyl malonate blocking agent is replaced by ethylacetoacetate.

21. The composition of claim 18 wherein up to about 60 mole % of the diethyl malonate blocking agent is replaced by ethylacetoacetate.

* * * * *